Patented Aug. 11, 1936

2,050,732

UNITED STATES PATENT OFFICE 2,050,732

PROCESS FOR STORING MOTOR FUELS

Edward N. Roberts, Casper, Wyo., assignor to Standard Oil Company, Chicago, Ill., a corporation of Indiana No Drawing. Application November 13, 1933, Serial No. 697,806

5 Claims. (Cl. 44—9)

This invention relates to a method of storing stabilized cracked gasoline and motor fuels. The invention is particularly concerned with the method of inhibiting color formation during storage of motor fuel products which have been stabilized with an antioxidant.

When motor fuels such as cracked gasolines or cracked naphthas are stabilized with antioxidants at the refinery, they are stored in tanks or later stored in tanks at some distributing point. It is customary to maintain from about 3 to 12 inches of water in the bottom of these storage tanks in order to avoid leaks. Frequently several inches of water collect in the bottom of these tanks due to the settling of water which is suspended in the gasoline, or water from the atmosphere gets into the motor fuel and settles to the bottom of the tank. Breathing of air into the tank results also in condensation of moisture on the inside. In most cases water will collect in the bottom of storage tanks which are used for storing motor fuels, even if attempts are made to keep water out of such tanks.

Motor fuels such as cracked gasoline and cracked naphthas which have been stabilized with antioxidants of the phenolic, amine and aminophenol types often become discolored when stored in the presence of water which is neutral or water which has an alkalin reaction. This is usually accompanied also by a loss in antioxidants. I have discovered that color formation in antioxidant stabilized motor fuels, which are stored in tanks or containers in contact with water, can be prevented by one of two days: (1) by adding an acidic water soluble compound to the water or by adding a water soluble compound that reduces the pH value of the water slightly below 7; (2) by adding a water soluble reducing agent to the water, regardless of whether said reducing agent gives an acid or alkalin solution. Examples of compounds of the first class are sulfuric acid, hydrochloric acid, boric acid, benzoic acid, aluminum sulfate, monosodium phosphate, etc. The inorganic salts of the above type reduce the pH value of the aqueous solution to a value below 7 by virtue of the fact that they hydrolyze in water. The aforementioned substances possess various dissociation constants, the strong acids such as sulfuric and hydrochloric having high dissociation constants whereas the weak acids such as benzoic acid, have relatively low dissociation constants. The dissociation constant of benzoic acid, for example, is about $6.6 \times 10^{-5}$. Examples of compounds of the second type are stannous sulfate, ferrous sulfate, sulfites, acid sulfites and thiosulfate such as sodium sulfite, sodium acid sulfite, sodium thiosulfate and similar alkalin or alakli metal sulfites, acid sulfites and thiosulfates. The sulfites are preferable to the acids as they have less corrosive action on iron tanks.

To illustrate my invention, cracked gasoline having an initial color of 28 Saybolt, octane number 72.5, end point 372° F., an induction period of 274 minutes by the Voorhees test (Ind. & Eng. Chem., vol. 25, page 397, 1933) and sweetened with doctor, was stabilized with 0.002% of benzyl aminophenol. The addition of 0.002% of benzyl aminophenol increased the induction period to 685 minutes. This stabilized cracked gasoline was stored in the dark under the conditions set forth in Table I, and the Saybolt color of the cracked gasoline was determined at the end of 4.5 weeks and 14 weeks. Similarly, stabilized benzol or sabilized mixtures of benzol and gasoline tend to develop objectionable color when stored in the presence of water or alkalin solutions free from reducing agents, but such color formation and deterioration can be avoided in the same manner as illustrated with the cracked gasoline in the following table:

Table 1

| Example | Condition of storage | Color of stabilized gasoline after— | | Color of unstabilized gasoline after— | |
|---|---|---|---|---|---|
| | | 4.5 wks. | 14 wks. | 4.5 wks. | 14 wks. |
| 1 | No water present | 26 | 24–25 | 27+ | 25+ |
| 2 | Distilled water (neutral) | 6 | 4 | 26+ | 25+ |
| 3 | Tap water, slightly alkalin | –13 | –16 | 27 | 25+ |
| 4 | Aqueous sulfuric acid solution (.05%) | 23+ | 21+ | 26 | 21+ |
| 5 | Aqueous Na₂SO₃ solution (1/1000) | 26 | 23 | 26+ | 25+ |
| 6 | Aqueous NaHSO₃ (1/1000) | 26+ | 26 | 26+ | 25+ |
| 7 | Aqueous aluminum sulfate (2/1000) | 26 | 23 | 26+ | 25+ |
| 8 | Aqueous Na₂S₂O₃ (1/1000) | 26 | 25 | 26+ | 25+ |
| 9 | Aqueous benzoic acid solution (1/1000) | | 15 | | 25+ |

It is apparent from the above table that when cracked gasoline has been stabilized with benzyl aminophenol it tends to develop color if stored in the presence of a neutral aqueous solution or an alkalin aqueous solution free from reducing agents. However, color formation can be inhibited in this stabilized gasoline if it is stored in contact with an acidic aqueous solution or a solution containing a reducing agent.

As another example of my invention, a sweetened cracked gasoline having an initial color of 26, octane 64.5, induction period of 357 minutes, was stabilized with 0.002% of benzyl aminophenol. The stabilized cracked gasoline then had an induction period of 555 minutes. This stabilized motor fuel was stored in a 37,000 gallon tank by the following procedure: All of the water was withdrawn from the bottom of the tank and the stabilized motor fuel to be stored was pumped into the tank until a one to two foot level was obtained. Water was then pumped in under the motor fuel and a sodium sulfite solution added to the water line by an ejector at such a rate that all of the sulfite was added and mixed with the water by the time a 6 or 7 inch bottom of water was obtained. The sodium sulfite should be added in an amount to give a concentration between 0.1 and 0.2% of sulfite. After the sulfite bottom has been added, the tank is then filled with the stabilized gasoline. By adding the sulfite solution or stabilized water bottom under a foot or so of stabilized motor fuel, as above illustrated, the atmospheric oxygen is not given an opportunity to diminish the sulfite content of the solution. At the end of five and one half weeks the color of the stabilized cracked gasoline was between 23 and 24 Saybolt; the initial color was 26 Saybolt. The same sample of stabilized cracked gasoline was stored over distilled water, and tap water; and at the end of five and one half weeks it had a color of −7 and −16 Saybolt respectively. However, an unstabilized sample of the cracked gasoline was stored over tap water for five and one half weeks and it had a color of 23 Saybolt at the end of this period. It is apparent from the above data that water causes the aminophenol in the gasoline to impart an undesirable color to the gasoline.

Similarly, when a cracked gasoline was stabilized with paraphenylene diamine and stored over alkalin tap water for two days, the color fell from 26 Saybolt to about −16 Saybolt, whereas when the same stabilized cracked gasoline was stored over an aqueous solution of sodium sulfite for eleven days there was only a slight change in the color of the gasoline.

I have found that my process can be used with motor fuels and hydrocarbon oils which have been stabilized with antioxidants having reducing properties, such as the aminophenols and substituted aminophenols, aryl polyamines and substituted aryl polyamines, phenols, poly-hydroxy benzene compounds, poly-phenols and aryl amines. Examples of these antioxidants are methyl-, ethyl- and propyl-aminophenols, para-methyl aminophenol, ortho-, meta- and para-aminophenols, ortho-, meta- and para-phenylene diamine, para-methyl phenylene diamine, cresol, pyrogallol, catechol, hydroquinone, alpha naphthol, alpha and beta naphthylamines, amino naphthols, para-phenyl aminophenol, and the like.

My invention may be employed with any hydrocarbon oil having the characteristics of gasoline and motor fuel, and particularly those hydrocarbon oils boiling below about 550° F. which have been stabilized with an inhibitor having reducing properties.

The reducing bodies such as the sulfites, acid sulfites and thiosulfates may be used in various concentrations but in all cases these reducing agents should be used in quantities sufficient to use up, first, the oxygen in the water, and the oxygen that diffuses in through the gasoline during the storage period. Various other methods than the one described may be used to introduce the water soluble stabilizer in the storage system. Thus the stabilizer may be dispersed in colloidal form in the gasoline, later to be extracted by the water in the storage tank; or a supply of the inhibitor may be placed in the storage tank in contact with the water layer where it may dissolve slowly and maintain a sufficient concentration for satisfactory stabilization.

While I have described my invention with reference to specific antioxidants and acidic or reducing solutions, my invention is not to be limited thereby except as set forth in the claims.

I claim:

1. In the process of storing gum forming cracked gasoline which has been stabilized against gum formation by the addition of a small proportion of an antioxidant selected from the class of phenols, amines and amino phenols whereby said gasoline is rendered susceptible to formation of color when stored over a layer of water, the method of preventing said color formation comprising dissolving in said water layer a small amount of a stabilizing agent selected from the class of sodium thiosulfate, metal sulfites and acids and acid salts having a dissociation constant above $6.6 \times 10^{-5}$.

2. In the process of storing gum forming cracked gasoline which has been stabilized against gum formation by the addition of a small proportion of an antioxidant selected from the class of phenols, amines and amino phenols whereby said gasoline is rendered susceptible to formation of color when stored over a layer of water, the method of preventing said color formation comprising dissolving in said water layer a small amount of a stabilizing agent comprising sodium sulfite.

3. In the process of storing gum forming cracked gasoline which has been stabilized against gum formation by the addition of a small proportion of an antioxidant selected from the class of phenols, amines and amino phenols whereby said gasoline is rendered susceptible to formation of color when stored over a layer of water, the method of preventing said color formation comprising dissolving in said water layer a small amount of a stabilizing agent selected from the class of acids having a dissociation constant above $6.6 \times 10^{-5}$.

4. In the process of storing gum forming cracked gasoline which has been stabilized against gum formation by the addition of a small proportion of an antioxidant selected from the class of phenols, amines and amino phenols whereby said gasoline is rendered susceptible to formation of color when stored over a layer of water, the method of preventing said color formation comprising dissolving in said water layer .05 to 0.2 percent of a stabilizing agent selected from the class of sodium thiosulfate, metal sulfites, acids, and acid salts having a dissociation constant above $6.6 \times 10^{-5}$.

5. The method of preventing during storage color formation in cracked gasoline which has been stabilized with a small amount of para-benzyl aminophenol to inhibit gum formation, which comprises maintaining in a separate phase and in contact with said motor fuel an aqueous solution of sodium sulfite.

EDWARD N. ROBERTS.